(12) United States Patent
Cool et al.

(10) Patent No.: US 10,890,700 B2
(45) Date of Patent: Jan. 12, 2021

(54) ELECTRONIC DEVICES HAVING INFRARED-TRANSPARENT ANTIREFLECTION COATINGS

(71) Applicant: Apple Inc., Cupertino, CA (US)

(72) Inventors: Stephen C. Cool, San Jose, CA (US); Li Zhang, Mountain View, CA (US); Avery P. Yuen, San Jose, CA (US); Kristina A. Babiarz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/566,627

(22) Filed: Sep. 10, 2019

(65) Prior Publication Data

US 2020/0096686 A1    Mar. 26, 2020

Related U.S. Application Data

(60) Provisional application No. 62/735,479, filed on Sep. 24, 2018.

(51) Int. Cl.
    *G02B 5/20*    (2006.01)
    *G02B 5/28*    (2006.01)
    *G02B 1/115*   (2015.01)

(52) U.S. Cl.
    CPC .............. *G02B 5/208* (2013.01); *G02B 1/115* (2013.01); *G02B 5/207* (2013.01); *G02B 5/281* (2013.01)

(58) Field of Classification Search
    CPC ........ G02B 5/208; G02B 5/281; G02B 5/207; G02B 1/115
    See application file for complete search history.

(56) References Cited

U.S. PATENT DOCUMENTS

| 8,372,513 | B2 | 2/2013 | Anderson et al. |
| 9,423,529 | B2 | 8/2016 | Koyama |
| 9,761,740 | B2 | 9/2017 | Reinert |
| 9,864,116 | B2 | 1/2018 | Matsuyuki et al. |
| 2017/0184764 | A1* | 6/2017 | Matsuyuki ........... H05K 5/0017 |

(Continued)

FOREIGN PATENT DOCUMENTS

| CN | 207336790 U | 5/2018 |
| JP | 2017049469 A | 3/2017 |

*Primary Examiner* — Kevin Quarterman
(74) *Attorney, Agent, or Firm* — Treyz Law Group, P.C.; Michael H. Lyons; David K. Cole (57) ABSTRACT

An electronic device may have a display cover layer provided with an infrared-transparent antireflection coating. A pixel array may emit visible light through the cover layer and the coating. An infrared emitter may emit infrared light and an infrared sensor may receive infrared light through the coating and the cover layer. The coating may include a stack of thin-film interference layers. The stack may include alternating lower and higher refractive index layers. The layers may have thicknesses and materials that configure the coating to exhibit an infrared transmittance of greater than 94% from 920 nm to 960 nm and a photopic reflectance of less than 1.5%. The coating may reflect visible light to prevent displayed images from being obscured by visible reflections. At the same time, some photopic reflectance of the coating may be sacrificed to maximize infrared transmittance and accommodate operation by the infrared emitter and sensor.

20 Claims, 10 Drawing Sheets

(56) References Cited

U.S. PATENT DOCUMENTS

| | | |
|---|---|---|
| 2018/0067245 A1* | 3/2018 | Giachino ............ H01L 27/1462 |
| 2018/0081085 A1 | 3/2018 | Ge et al. |
| 2018/0081086 A1* | 3/2018 | Wang ........................ G02B 1/14 |
| 2018/0299587 A1 | 10/2018 | Aitken et al. |
| 2018/0321428 A1* | 11/2018 | Jones ......................... G01J 3/02 |
| 2019/0258107 A1 | 8/2019 | Fujii |
| 2019/0278098 A1* | 9/2019 | Prest ...................... G02B 5/208 |
| 2019/0317258 A1* | 10/2019 | Zheng ................... G01J 1/4204 |
| 2019/0353836 A1* | 11/2019 | Wilson ............... G02B 27/0172 |
| 2019/0369314 A1* | 12/2019 | Hebrink ................. B32B 27/20 |

* cited by examiner

| COATING | 50A | 50B | 50C | 50D | 50E | 50F | 50G |
|---|---|---|---|---|---|---|---|
| LAYER NUMBER | LAYER THICKNESS (nm) | LAYER THICKNESS (nm) | LAYER THICKNESS (nm) | LAYER THICKNESS (nm) | LAYER THICKNESS (nm) | LAYER THICKNESS (nm) | LAYER THICKNESS (nm) |
| 60-9 | 90.0-95.0 | 90.0-100.0 | 93.0-98.0 | 85.0-95.0 | - | - | - |
| 60-8 | 85.0-92.0 | 80.0-85.0 | 70.0-76.0 | 80.0-89.0 | - | - | - |
| 60-7 | 9.0-15.0 | 20.0-30.0 | 20.0-30.0 | 5.0-12.0 | 81.0-89.0 | 85.0-90.0 | 85.0-95.0 |
| 60-6 | 59.0-69.0 | 45.0-51.0 | 41.0-50.0 | 58.0-64.0 | 65.0-75.0 | 48.0-55.0 | 88.0-98.0 |
| 60-5 | 34.0-40.0 | 53.0-60.0 | 62.0-68.0 | 35.0-40.0 | 11.0-15.0 | 12.0-17.0 | 20.0-25.0 |
| 60-4 | 35.0-45.0 | 30.0-37.0 | 20.0-35.0 | 32.0-38.0 | 35.0-46.0 | 42.0-50.0 | 35.0-42.0 |
| 60-3 | 62.0-70.0 | 65.0-70.0 | 65.0-76.0 | 51.0-61.0 | 50.0-58.0 | 45.0-50.0 | 66.0-72.0 |
| 60-2 | 8.0-14.0 | 11.0-19.0 | 10.0-15.0 | 10.0-15.0 | 9.0-19.0 | 13.0-20.0 | 12.0-18.0 |
| 60-1 | 135.0-141.0 | 150.0-161.0 | 160.0-171.0 | 172.0-180.0 | 66.0-70.0 | 40.0-49.0 | 32.0-42.0 |
| Photopic Vis R% (10°) | 0.72% | 0.58% | 0.62% | 0.73% | 0.57% | 0.67% | 0.60% |
| Photopic Vis R% (45°) | 1.37% | 1.28% | 1.28% | 1.38% | 1.16% | 1.39% | 1.24% |
| IR T% (10°) | 95.80% | 94.10% | 93.90% | 95.80% | 92.90% | 93.80% | 95.30% |
| IR T% (45°) | 95.10% | 93.20% | 93.20% | 95.80% | 89.90% | 89.90% | 92.30% |

ELECTRONIC DEVICES HAVING INFRARED-TRANSPARENT ANTIREFLECTION COATINGS

This application claims the benefit of provisional patent application No. 62/735,479, filed Sep. 24, 2018, which is hereby incorporated by reference herein in its entirety.

FIELD

This relates generally to optical coatings and, more particularly, to antireflection coatings for transparent structures in electronic devices.

BACKGROUND

Electronic devices such as tablet computers, cellular telephones, telephones, computers, watches, and other devices contain transparent members such as display cover layers. Transparent members such as these may be prone to undesired light reflections. Light reflections in display cover layers can obscure images that are being presented on a display.

Electronic devices often include other light sources or light sensors located behind display cover layers. If care is not taken, coatings provided over the display cover layer can inhibit sensing and/or transmission by these components.

SUMMARY

An electronic device may have transparent members such as a display cover layer. The display cover layer may be provided with an infrared-transparent antireflection coating. A pixel array may emit visible light through the display cover layer and the coating. An infrared emitting component may emit infrared light through the display cover layer and the coating. An infrared sensor may receive infrared light through the coating and the display cover layer.

The coating may include a stack of thin-film interference layers. The stack may include alternating lower and higher refractive index layers (e.g., a first set of silicon dioxide layers interleaved with a second set of silicon nitride layers). The lower refractive index layers may form uppermost and lower-most layers of the coating. As examples, the coating may be a nine-layer coating having five lower refractive index layers and four higher refractive index layers or a seven-layer coating having four lower refractive index layers and three higher refractive index layers. The layers may have thicknesses and materials that configure the coating to exhibit a photopic reflectance of less than 1.5% and an infrared transmittance of greater than 94% within a range of wavelengths associated with the infrared light emitted by the infrared emitting component and received by the infrared sensor.

The coating may reflect visible light to prevent images produced by the pixel array from being obscured by visible reflections. At the same time, some photopic reflectance of the coating may be sacrificed to maximize infrared transmittance and accommodate operation by the infrared emitting component and the infrared sensor. Control circuitry may use the infrared light emitted by the infrared emitting component and received by the infrared sensor to perform facial recognition operations, depth sensing, or other operations.

DETAILED DESCRIPTION

Electronic devices and other items may be provided with transparent structures. The transparent structures may include a display cover layer for a display. The display may include a pixel array that displays visible light images through the display cover layer. An infrared light-based optical component may be mounted behind the display cover layer at a periphery of the pixel array. The infrared-based optical component may include one or more infrared light sources that transmit infrared light through the display cover layer and/or one or more infrared image sensors that receive infrared light through the display cover layer. The electronic device may include control circuitry that processes the transmitted and received infrared light to perform depth sensing operations, proximity sensing operations, infrared imaging operations, facial recognition operations, and/or other operations.

Infrared-transparent antireflection coatings may be formed on transparent structures in the electronic device. Illustrative configurations in which infrared-transparent antireflection coatings are provided on the display cover layer for the device may be described herein as an example. In general, however, infrared-transparent antireflection coatings may be formed on any suitable transparent members.

The infrared-transparent antireflection coatings may include alternating layers of high and low refractive index layers that form a thin film interference filter. The layers may have refractive indices and thicknesses that configure the coating (thin film interference filter) to exhibit a sufficiently low visible-wavelength reflectance while also exhibiting a sufficiently high infrared-wavelength transmittance (e.g., at wavelengths covered by the infrared light-based component such as wavelengths from 920 nm to 960 nm). As an example, the layers may configure the coating to exhibit a photopic reflectance of less than 1.5% and an infrared transmittance of greater than 94% over a wide range of incident angles. This may allow the coating to both minimize visible light reflections that would otherwise obscure images presented by the display, while concurrently allowing sufficient infrared light to pass through the display cover layer to support operations of the infrared-based optical component (e.g., facial recognition operations associated with transmitted and received infrared light).

Figure 1:
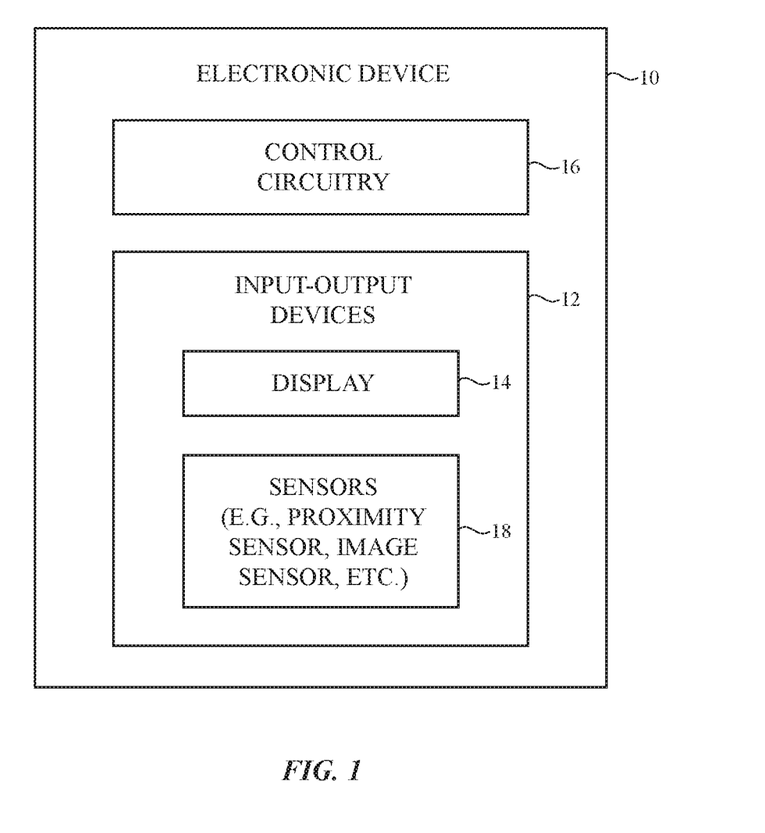
FIG. 1 is a schematic diagram of an illustrative electronic device in accordance with an embodiment.

An illustrative electronic device of the type that may be provided with infrared-transparent antireflection coatings is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, light-emitting diodes for components such as status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may include pixel circuitry that displays images at visible wavelengths.

Input-output devices 12 may also include sensors 18. Sensors 18 may include a capacitive proximity sensor, a light-based proximity sensor, an ambient light sensor, a light-based fingerprint sensor, a fingerprint sensor based on a capacitive touch sensor, a magnetic sensor, an accelerometer, a force sensor, a touch sensor for a button or track pad, a temperature sensor, a pressure sensor, a compass, a microphone or other sound sensor, a visible digital image sensor (visible-light camera), an infrared digital image sensor (infrared-light camera), and other sensors. Sensors 18 may be used to gather user commands (e.g., commands that direct control circuitry 16 to take action), may be used to gather information on the environment surrounding device 10 (e.g., information on ambient light levels, ambient temperature, ambient atmospheric pressure, etc.), and may be used in performing biometric authentication operations (e.g., using a fingerprint sensor, using visible and/or infrared cameras, using voice recognition, etc.). After a user has been authenticated using biometric authentication operations and/or after entering a password or supplying other information to device 10, control circuitry 16 may provide the user with access to the features of device 10 (e.g., circuitry 16 may allow the user to make telephone calls, access stored information in storage in device 10, send text messages or email messages, etc.).

In one suitable arrangement that is sometimes described herein as an example, sensors 18 include an infrared-based optical component (e.g., an infrared sensor) that transmits infrared light (e.g., light at wavelengths between 700 nm and 1 mm) using one or more infrared light sources. The infrared light sources may include infrared light emitting diodes (LEDs), vertical cavity surface emitting lasers (VCSELs), or other infrared light emitting elements. The infrared-based optical component may also receive infrared light (e.g., the transmitted infrared light that has been reflected off of an external object) using infrared light sensing elements such as one or more infrared photodiodes. Control circuitry 16 may process the transmitted and received infrared light to perform depth sensing, object detection, facial recognition, or other operations.

Figure 2:
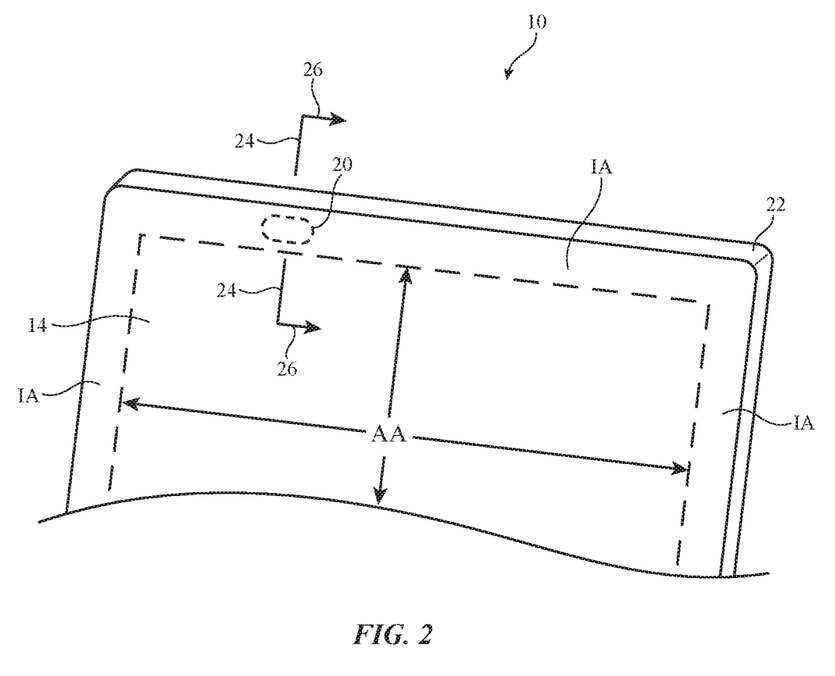
FIG. 2 is a perspective view of a portion of an illustrative electronic device display having an infrared-based optical component in accordance with an embodiment.

A perspective view of a portion of an illustrative electronic device 10 is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may be a liquid crystal display, may be an electrophoretic display, may be an organic light-emitting diode display or other display with an array of light-emitting diodes, may be a plasma display, may be an electrowetting display, may be a display based on microelectromechanical systems (MEMs) pixels, or may be any other suitable display. Display 14 may have an array of pixels in active area AA. The pixels of active area AA may display images for a user of device 10. Active area AA may be rectangular or may have other suitable shapes.

Inactive border area IA may run along one or more edges of active area AA and may be free of pixels. Inactive border area IA may contain circuits, signal lines, and other structures that do not emit light for forming images. To hide circuitry and other components in border area IA from view by a user of device 10, the underside of the outermost layer of display 14 (e.g., the display cover layer or other display layer) may be coated with an opaque masking material. The opaque masking material may have a dark color (e.g., the opaque masking material may be black, dark blue, dark gray, or other dark colors) or may have other opaque colors (e.g., opaque white, opaque silver, etc.). Configurations in which the opaque masking layer in inactive area IA of display 14 is formed from a dark material such as black ink (e.g., a polymer containing visible-light-absorbing dye and/or pigment that imparts a black color to the polymer) may sometimes be described herein as an example. This is merely illustrative. The opaque masking layer may be formed from opaque inks or other materials of other colors or may be omitted if desired.

Infrared-based optical components (sometimes referred to as infrared light-based components, infrared light-based devices, infrared optical devices, infrared sensors, etc.) may be mounted under inactive border area IA. One or more windows may be formed from openings in the opaque masking layer of inactive area IA to accommodate the optical components (e.g., optical components from sensors 18 of FIG. 1). As shown in FIG. 2, one or more infrared-based optical components such as infrared-based optical component 20 may be formed in a peripheral portion of display 14 such as inactive border area IA. During operation, infrared-based optical component 20 may emit infrared light through display 14 (e.g., through the display cover layer) and may receive infrared light through display 14.

Figure 3:
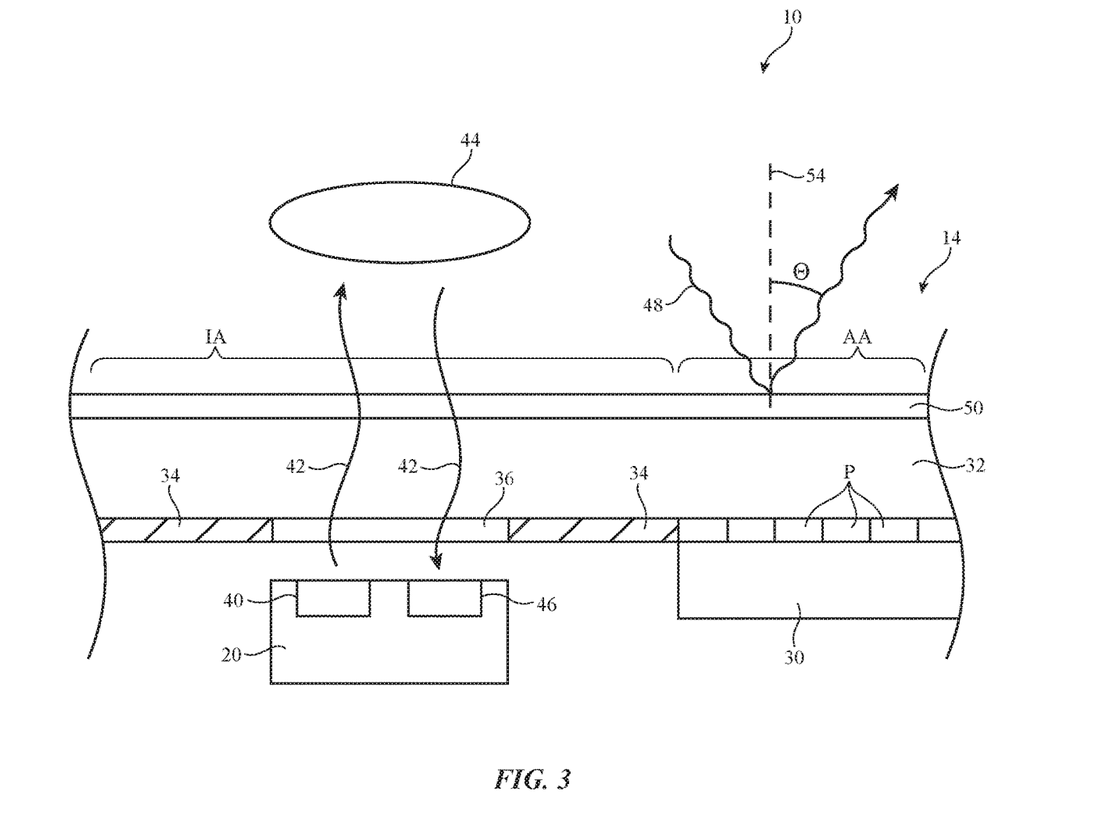
FIG. 3 is a cross-sectional side view of an illustrative electronic device having a display cover layer provided with an infrared-transparent antireflection coating that inhibits reflection of external visible light while transmitting infrared light associated with an infrared-based optical component in accordance with an embodiment.

FIG. 3 is a cross-sectional side view of display 14 of FIG. 2 taken along line 24 and viewed in direction 26 of FIG. 2. In the illustrative example of FIG. 3, infrared-based component 20 has been formed in inactive area IA of display 14. In active area AA, display 14 includes a pixel array (sometimes referred to as a display module or display) such as pixel array 30. Pixel array 30 may have an array of pixels P for displaying images for a user of device 10. Pixels P may be organic light-emitting diode pixels, liquid crystal display pixels, or other suitable display pixels. The underside of display cover layer 32 in active area AA is free of opaque masking material 34, so that images on pixel array 30 can be viewed through display cover layer 32.

In inactive area IA, the underside of display cover layer 32 may be covered with opaque masking material such as opaque masking layer 34. Opaque masking layer 34 may be a layer of ink (e.g., a layer of polymer that contains visible-light-absorbing substances such as dyes and/or pigments that block visible light) and/or may contain thin-film layers for forming a light-blocking thin-film interference filter that blocks visible light. As an example, opaque masking layer 34 may be a layer of black ink formed from polymer that includes black pigment (e.g., carbon black). Other types of opaque masking layer material may be used to form layer 34 if desired.

Due to the presence of opaque masking layer 34, internal device components (e.g., inactive display structures, integrated circuits, printed circuit board structures, etc.) may be hidden from view from a user of device 10. Opaque masking layer 34 is generally at least somewhat opaque at infrared wavelengths, so one or more infrared-transparent regions such as window 36 may be formed to accommodate infrared-based optical component 20.

As shown in FIG. 3, infrared-based optical component 20 is aligned with window 36 in opaque masking layer 34.

Infrared-based optical component 20 may include one or more infrared light emitting components 40. Infrared light emitting components 40 may include infrared light emitting diodes, infrared lasers such as VCSELs, and/or other infrared light emitting elements that emit infrared light 42 through window 36 and display cover layer 32. Infrared light emitting components 40 may, for example, emit infrared light 42 at 940 nm, 920 nm, 960 nm, 935 nm, 945 nm, between 935 and 945 nm, between 930 and 950 nm, between 920 nm and 960 nm, or any other desired infrared wavelengths.

Emitted infrared light 42 may be used for providing infrared illumination for an infrared camera, infrared output light for an amplitude proximity sensor, infrared output light for a time-of-flight proximity sensor, infrared light for performing object detection, depth sensing, and facial recognition operations, etc. Infrared-based optical component 20 may include one or more infrared light sensing elements 46. Infrared light sensing elements 46 may include light sensors (e.g., discrete silicon photodetectors that measure infrared light at one or more infrared wavelengths, two-dimensional light sensor arrays that form infrared digital image sensors, etc.), infrared light sensors such as silicon photodetectors in infrared amplitude or time-of-flight proximity sensors, or other suitable light-emitting and/or light-detecting infrared optical components. Infrared light sensing components 46 may, in combination with infrared light emitting components 40, perform object detection, facial recognition, and/or depth sensing operations using emitted and received infrared light.

In one suitable arrangement, infrared light emitting components 40 (sometimes referred to herein as infrared light sources 40) may include a flood illuminator and a dot projector. Infrared light sensing components 46 may include one or more infrared light sensors (e.g., two infrared light sensor arrays or two infrared cameras/digital image sensors). The dot projector may, for example, include an array of VCSELs or other infrared light emitting elements that emit a grid, array, matrix, or other pattern of infrared light dots (e.g., emitted light 42 may include dots of light emitted at infrared wavelengths). This pattern of infrared light 42 is reflected off of external objects 44 facing display 14. The reflected infrared light passes through display cover layer 32 and window 36 and is received by infrared light sensing components 46.

Infrared light sensing components 46 may generate image data (e.g., infrared images or image signals) in response to this reflected infrared light. Control circuitry 16 (FIG. 1) may process this image data (sometimes referred to herein as face image data, front-facing image data, or facial recognition image data) to identify facial features of the user (or other persons or objects 44 that reflected the emitted infrared light back towards device 10). The facial recognition image data may include a depth map that maps three-dimensional depth of the scene in front of display 14 (e.g., that maps a distance between objects in the scene in front of display 14 and display 14). Control circuitry 16 may use the identified facial features to authenticate the identity of the user of device 10. For example, if the identified facial features match those of an authorized user stored on control circuitry 16, control circuitry 16 may unlock device 10 or may otherwise authorize or unlock software and/or hardware features on device that are only available to authorized users.

While infrared-based optical component 20 transmits and receives infrared light through display cover layer 32, pixel array 30 transmits (emits) light at visible wavelengths through display cover layer 32 (e.g., for view by a user). If care is not taken, visible light 48 from external sources may reflect off of one or more surfaces of display cover layer 32 (e.g., at angle θ relative to normal axis 54). This reflected visible light (e.g., glare) can obscure the visible light emitted by pixel array 30 and make the emitted visible light more difficult to see. Antireflection coatings such as antireflection coating 50 may be formed on display cover layer 32 to reduce reflections of external visible light 48 and thereby help users view images on display 14.

Antireflection coating 50 may cover substantially all of the lateral area of display cover layer 32 (e.g., coating 50 may extend over both pixel array 30 and infrared-based optical component 20). If care is not taken, antireflection coatings on display cover layer 32 can inhibit transmission of infrared light such as infrared light 42 associated with infrared-based optical component 20. It may therefore be desirable to be able to provide antireflection coatings 50 that can both limit visible light reflection and maximize infrared light transmission to allow infrared-based optical component 20 to perform sensing operations (e.g., facial recognition operations) while also maximizing visibility of the images produced by display 14.

Figure 4:
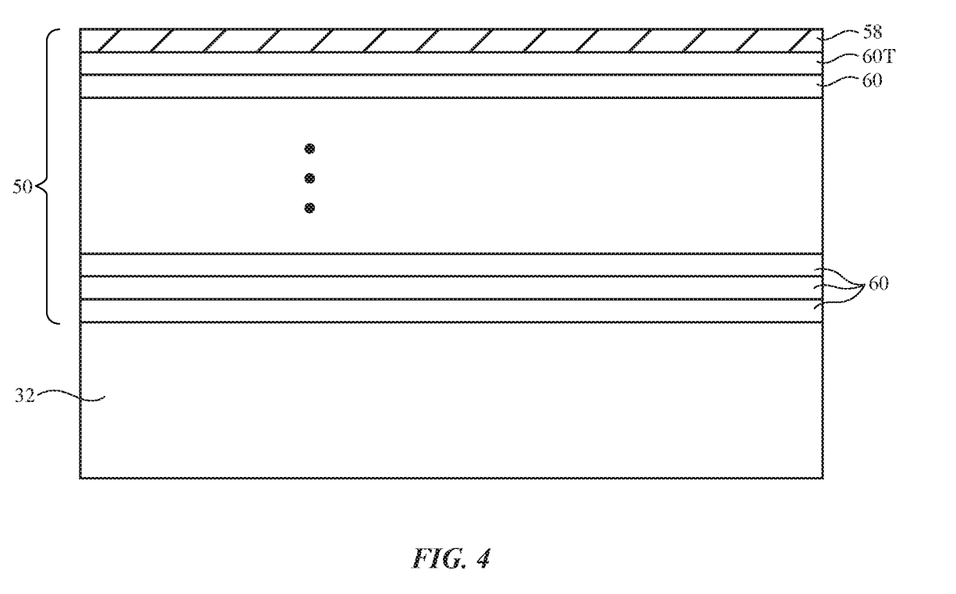
FIG. 4 is cross-sectional side view of an illustrative infrared-transparent antireflection coating in accordance with an embodiment.

Antireflection coating 50 of FIG. 3 may be provided with layers of material that configure the coating to optimize both visible light reflection and infrared transmission (e.g., to maximize infrared light transmission at wavelengths associated with component 20 while minimizing visible light reflection) over a wide range of angles (field of view). Coating 50 may therefore sometimes be referred to herein as infrared-transparent antireflection coating 50. An illustrative infrared-transparent antireflection coating 50 for display cover layer 32 is shown in FIG. 4. As shown in FIG. 4, infrared-transparent antireflection coating 50 may be formed on display cover layer 32, which may sometimes be referred to herein as substrate 32. This is merely illustrative and, in general, coating 50 may be formed on any desired transparent structures in device 10.

Substrate 32 (display cover layer 32) may be formed from glass, plastic, ceramic, sapphire or other crystalline materials, or other transparent material. The thickness of substrate 32 may be 0.1 mm to 5 mm, more than 0.3 mm, more than 0.5 mm, less than 3 mm, less than 2 mm, less than 1.5 mm, or less than 1 mm (as examples). Infrared-transparent antireflection coating 50 may reduce light reflections at visible wavelengths. For example, the use of coating 50 on display cover layer 32 may reduce visible light reflection by at least 10%, by at least 40%, by at least 70%, by 30-90%, by greater than 90% or by other suitable amounts relative to scenarios where coating 50 is omitted. At the same time, coating 50 may allow a sufficient amount of infrared light to pass without being attenuated (e.g., 94% or greater of all incident infrared light may be transmitted through the coating) in order to allow infrared-based component 20 (FIG. 3) to operate properly.

Infrared-transparent antireflection coating 50 includes a thin-film interference filter formed from a stack of layers of material such as inorganic dielectric layers with different index of refraction values (see, e.g., thin-film interference filter layers 60 and layer 60T). These layers may be configured to form a thin-film interference filter that suppresses visible light reflections (e.g., via destructive interference) while promoting infrared light transmission through selection of appropriate thicknesses and refractive index values for each of the layers, and by adjustment of the total number of layers. The lowermost of the thin-film interference filter layers 60 faces substrate 32 and may be formed on substrate 32 or may be coupled to substrate 32 using an interposed adhesion layer (not shown). The uppermost of the thin-film interference filter layers 60 (layer 60T) faces away from substrate 32 and may optionally be coated with antismudge (oleophobic) layer 58. There may be any suitable number of thin-film layers in the thin-film interference filter of coating 50 (e.g., 3-10, 9, 7, 5-20, more than 5, more than 10, more than 15, fewer than 50, fewer than 30, fewer than 25, etc.).

The thin-film interference filter layers may have higher index of refraction values (sometimes referred to as "high" index values) and lower index of refraction values (sometimes referred to as "low" index values). With one illustrative configuration, the thin-film interference filter is formed from alternating high and low refractive index layers. Examples of low-index materials include silicon oxide ($SiO_2$) and magnesium fluoride ($MgF_2$). These materials may have an index of refraction of 1.5 or lower. Examples of high index materials include titanium dioxide ($TiO_2$), niobium oxide ($Nb_2O_5$), tantalum oxide ($Ta_2O_5$), zirconium oxide ($ZrO_2$), hafnium oxide ($HfO_2$), silicon nitride ($Si_3N_4$), yttrium oxide ($Y_2O_3$), aluminum oxide ($Al_2O_3$), aluminum nitride (AlN), and diamond-like carbon. These materials may have a refractive index of 1.7 or higher (e.g., at least 1.8, at least 1.9, or at least 2.0). Diamond-like carbon (sometimes referred to as hard carbon) is amorphous carbon having a mixture of $sp^2$ (graphite) and $sp^3$ (diamond) phases. Other materials may be used in forming the thin-film layers of the thin-film interference filter for coating 50, if desired. These materials are merely illustrative.

To help prevent smudging on the outermost surface of coating 50, the outer surface of coating 50 may be provided with an antismudge layer such a layer 58. Layer 58 may be formed from a polymer such as a fluoropolymer or other material that resists smudging. Antismudge layer 58 may be relatively thin (e.g., 7 nm, less than 10 nm, 3-8 nm, more than 2 nm, etc.) and may have a relatively low index of refraction (e.g., 1.37). Layer 58 may therefore not have a significant impact on the antireflection performance of coating 50.

Figure 5:
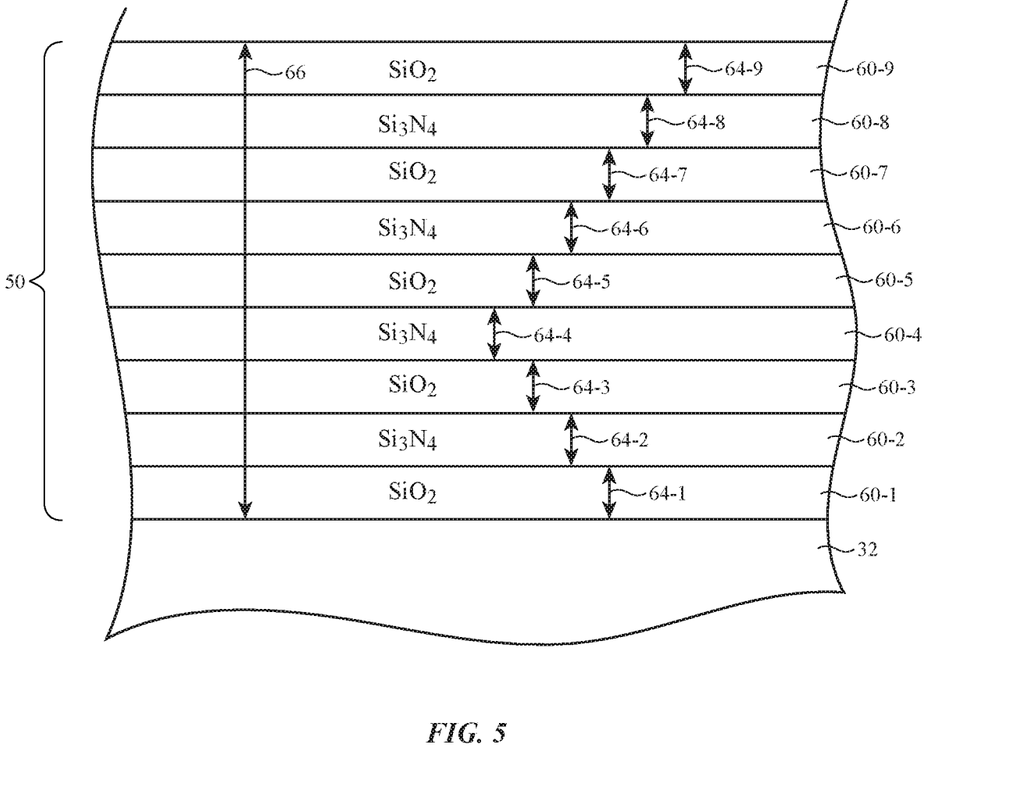
FIGS. 5 and 6 are cross-sectional side views of illustrative infrared-transparent antireflection coatings having multiple layers with different thicknesses and alternating refractive index values in accordance with an embodiment.

One example of the layers that may be used to form coating 50 is shown in FIG. 5. As shown in the example of FIG. 5, coating 50 may include nine alternating higher index layers 60 (e.g., even-numbered layers 60-2, 60-4, 60-6, and 60-8) and lower index layers 60 (e.g., odd-numbered layers 60-1, 60-3, 60-5, 60-7, and 60-9). The higher index layers may be layers of $Si_3N_4$ whereas the lower index of refraction layers may be $SiO_2$ layers, as one example. In general, the higher index layers may include any desired material having a greater index of refraction than the lower index layers and that provide coating 50 with desired reflective and transmissive characteristics. Each layer 60 may have a corresponding thickness 64 (e.g., layer 60-1 has thickness 64-1, layer 60-2 has thickness 64-2, layer 60-3 has thickness 64-3, etc.). Coating 50 may have a total thickness 66 (e.g., given by the sum of layer thicknesses 64). In general, greater numbers of layers 60 and a greater total thickness 66 may generate more mechanical stress on substrate 32 while allowing for more flexibility in tuning the optical characteristics of coating 50 than fewer layers 60 and a lower total thickness 66. Mechanical stress, visible reflectivity, and infrared transmission associated with coating 50 may be optimized when coating 50 has 7-9 layers 60 and a total thickness of 300-700 nm, for example.

Figure 6:
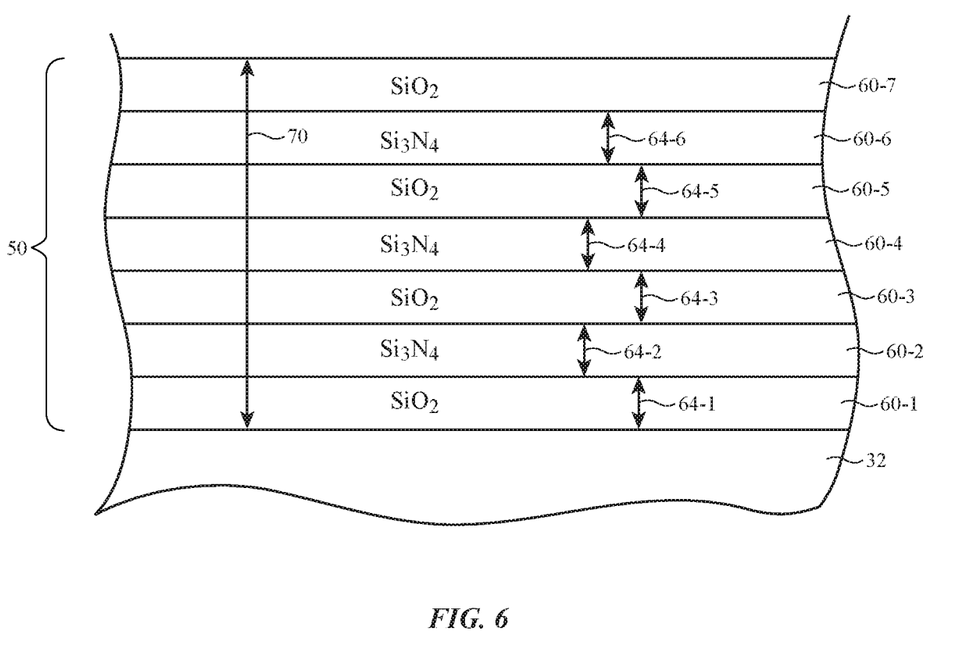

Another example of the layers that may be used to form coating 50 is shown in FIG. 6. In the example of FIG. 6, coating 50 includes only seven alternating layers 60 of higher and lower refractive index materials (e.g., layers 60-9 and 60-8 of FIG. 5 may be omitted). In this scenario, coating 50 has a total thickness 70 (e.g., a total thickness less than thickness 66 of FIG. 5). Seven-layer coating 50 of FIG. 6 may, for example, be easier and less expensive to manufacture than the nine-layer coating 50 of FIG. 5 (e.g., while sacrificing flexibility in optical performance).

In general, adjusting the thicknesses of each layer in an antireflection coating to reduce visible light reflection may also limit infrared transmission through the coating. If care is not taken, the coating can undesirably attenuate infrared signals such as those handled by infrared-based component 20 (FIGS. 2 and 3). Because coating 50 covers both infrared-based component 20 and pixel array 30, the thicknesses 64 of layers 60 in coating 50 (e.g., regardless of whether coating 50 has seven layers as shown in FIG. 6 or nine layers as shown in FIG. 5) may be selected to optimize both infrared transmission and visible reflection (e.g., to maximize infrared transmission for component 20 while minimizing visible reflection that would otherwise obscure images displayed using pixel array 30).

Figure 7:
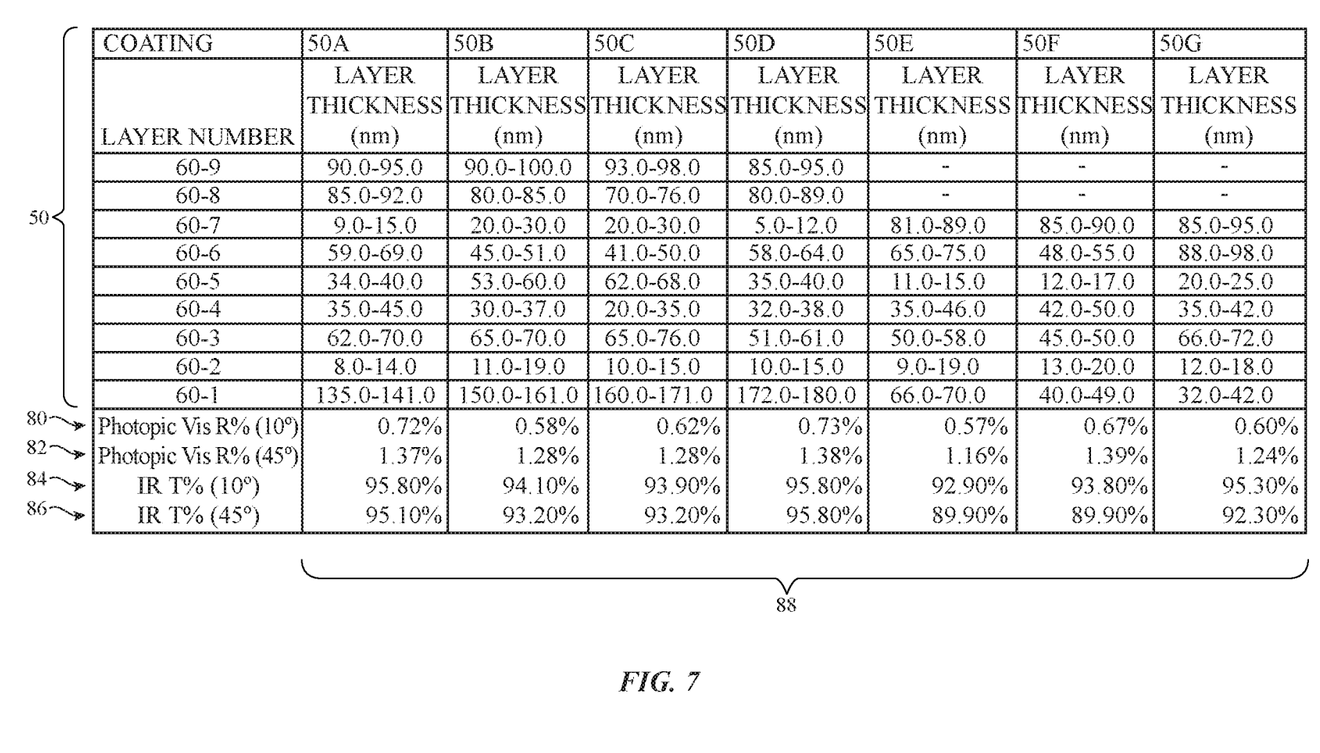
FIG. 7 is a table showing layer thicknesses for illustrative infrared-transparent antireflection coatings in accordance with an embodiment.

FIG. 7 is a table showing illustrative layer thicknesses that may be used in forming coating 50 to optimize these factors and to thus optimize performance for both infrared-based component 20 (e.g., facial recognition operations by device 10) and display 14 (e.g., displayed image clarity). In the example of FIG. 7, substrate 32 has been formed from glass and antismudge layer 58 (FIG. 4) has been omitted. Thin-film interference filter layers 60 (e.g., layers 60-1, 60-2, 60-3, etc.) have been formed from alternating silicon nitride and silicon oxide layers (e.g., as shown in FIGS. 5 and 6).

Each column 88 of FIG. 7 illustrates the thicknesses (e.g., thicknesses 64 of FIGS. 5 and 6) that may be used to form layers 60 for different possible implementations of antireflection coating 50 (e.g., a first exemplary coating 50A, an exemplary coating 50B, a third exemplary coating 50B, etc.). Each of these examples of coating 50 may provide infrared transparency while also limiting reflection of visible light. Coatings 50A, 50B, 50C, and 50D are nine-layer coatings of alternating high index and low index layers 60 (e.g., as shown in FIG. 5), whereas coatings 50E, 50F, and 50G are seven-layer coatings of alternating high index and low index layers 60 (e.g., as shown in FIG. 6).

The thicknesses 64 for each layer 60 in each of coatings 50A-50G (e.g., as shown by columns 88) are listed in FIG. 7 as ranges of nanometers (nm). Each layer may be provided with a thickness within the corresponding range. As an example, coating 50 may be configured as coating 50A of FIG. 7 and may be provided with a first layer 60-1 having a thickness from 135-141 nm (e.g., 136.5 nm, 137.3 nm, 137.5 nm, 138.3 nm, 139.2 nm, 140.7 nm, etc.), a second layer 60-2 having a thickness from 8-14 nm (e.g., 12.0 nm, 12.5 nm, 13 nm, 9 nm, 8.3 nm, etc.), a third layer 60-3 having a thickness from 62-70 nm (e.g., 62.1 nm, 63.7 nm, 63.9 nm, 68.8 nm, etc.), a fourth layer 60-4 having a thickness from 35-45 nm (e.g., 35.6 nm, 40.5 nm, 42.9 nm, 44.0 nm, etc.), a fifth layer 60-5 having a thickness from 34-40 nm (e.g., 37.4 nm, 39.9 nm, 34.1 nm, etc.), a sixth layer 60-6 having a thickness from 59.0-69.0 nm (e.g., 59.0 nm, 63.2 nm, 65.0 nm, 68.2 nm, etc.), a seventh layer 60-7 having a thickness from 9-15 nm (e.g., 9.1 nm, 10.0 nm, 11.0 nm, 14.2 nm, etc.), an eighth layer 60-8 having a thickness from 85-92 nm (e.g., 86.0 nm, 90.5 nm, 90.9 nm, 91.8 nm, etc.), and a ninth layer 60-9 having a thickness from 90-95 nm (e.g., 90.8 nm, 92.4 nm, 92.5 nm, 93.6 nm, 94.2 nm, etc.).

As another example, coating 50 may be configured as coating 50E of FIG. 7 and may be provided with a first layer 60-1 having a thickness from 66-70 nm (e.g., 66.5 nm, 66.8 nm, 68.6 nm, 69.1 nm, etc.), a second layer 60-2 having a thickness from 9-19 nm (e.g., 10.0 nm, 13 nm, 16.1 nm, 18.5 nm, etc.), a third layer 60-3 having a thickness from 50-58 nm (e.g., 52.9 nm, 53.7 nm, 50.1 nm, 57.4 nm, 58.0 nm, etc.), a fourth layer 60-4 having a thickness from 35-46 nm (e.g., 41.6 nm, 40.1 nm, 35.1 nm, 44.5 nm, 46.0 nm, etc.), a fifth layer 60-5 having a thickness from 11-15 nm (e.g., 11.2 nm, 11.3 nm, 12.2 nm, 13.5 nm, 14.7 nm, etc.), a sixth layer 60-6 having a thickness from 65-75 nm (e.g., 65.2 nm, 68.8 nm, 69.0 nm, 73.2 nm, etc.), and a seventh layer 60-7 having a thickness from 81-89 nm (e.g., 82.1 nm, 86.3 nm, 88.8 nm, 88.9 nm, etc.).

As yet another example, coating 50 may be configured as coating 50F of FIG. 7 and may be provided with a first layer 60-1 having a thickness from 40-49 nm (e.g., 12.5 nm, 44.1 nm, 49.0 nm, 48.4 nm, etc.), a second layer 60-2 having a thickness from 13-20 nm (e.g., 13.0 nm, 14 nm, 16.1 nm, 19.2 nm, etc.), a third layer 60-3 having a thickness from 45-50 nm (e.g., 45.9 nm, 46.2 nm, 49.1 nm, etc.), a fourth layer 60-4 having a thickness from 42-50 nm (e.g., 42.6 nm, 46.1 nm, 45.1 nm, 43.5 nm, 48.9 nm, etc.), a fifth layer 60-5 having a thickness from 12-17 nm (e.g., 11.2 nm, 12.3 nm, 14.0 nm, 14.2 nm, 16.7 nm, etc.), a sixth layer 60-6 having a thickness from 48-55 nm (e.g., 54.5 nm, 49.2 nm, 51.0 nm, etc.), and a seventh layer 60-7 having a thickness from 85-95 nm (e.g., 85.0 nm, 88.8 nm, 89.9 nm, 93.0 nm, etc.).

As another example, coating 50 may be configured as coating 50G of FIG. 7 and may be provided with a first layer 60-1 having a thickness from 32-42 nm (e.g., 32.5 nm, 36.1 nm, 36.2 nm, 41.4 nm, etc.), a second layer 60-2 having a thickness from 12-18 nm (e.g., 12.1 nm, 14 nm, 16.1 nm, 18.0 nm, etc.), a third layer 60-3 having a thickness from 66-72 nm (e.g., 68.8 nm, 71.2 nm, 69.1 nm, etc.), a fourth layer 60-4 having a thickness from 35-42 nm (e.g., 35.6 nm, 38.5 nm, 39.1 nm, 40.5 nm, 41.9 nm, etc.), a fifth layer 60-5 having a thickness from 20-25 nm (e.g., 22.2 nm, 21.3 nm, 22.4 nm, 23.2 nm, 21.7 nm, etc.), a sixth layer 60-6 having a thickness from 88-98 nm (e.g., 90.5 nm, 90.4 nm, 97.0 nm, etc.), and a seventh layer 60-7 having a thickness from 85-95 nm (e.g., 90.0 nm, 88.8 nm, 89.9 nm, 91.6 nm, etc.).

As yet an example, coating 50 may be configured as coating 50B of FIG. 7 and may be provided with a first layer 60-1 having a thickness from 150-161 nm (e.g., 157.5 nm, 152.3 nm, 159.5 nm, 160.7 nm, etc.), a second layer 60-2 having a thickness from 11-19 nm (e.g., 12.0 nm, 12.8 nm, 16 nm, 11 nm, 18.3 nm, etc.), a third layer 60-3 having a thickness from 65-70 nm (e.g., 66.1 nm, 65.7 nm, 67.5 nm, 68.8 nm, etc.), a fourth layer 60-4 having a thickness from 30-37 nm (e.g., 35.6 nm, 36.5 nm, 32.9 nm, 34.0 nm, etc.), a fifth layer 60-5 having a thickness from 53-60 nm (e.g., 55.4 nm, 59.9 nm, 54.1 nm, etc.), a sixth layer 60-6 having a thickness from 45-51 nm (e.g., 50.0 nm, 49.2 nm, 46.2 nm, 47.2 nm, etc.), a seventh layer 60-7 having a thickness from 20-30 nm (e.g., 21.1 nm, 30.0 nm, 26.0 nm, 21.5 nm, etc.), an eighth layer 60-8 having a thickness from 80-85 nm (e.g., 82.7 nm, 84.5 nm, 84.9 nm, 81.8 nm, etc.), and a ninth layer 60-9 having a thickness from 90-100 nm (e.g., 90.8 nm, 92.2 nm, 94.5 nm, 96.6 nm, 98.2 nm, etc.).

As still another example, coating 50 may be configured as coating 50C of FIG. 7 and may be provided with a first layer 60-1 having a thickness from 160-171 nm (e.g., 161.5 nm, 162.3 nm, 167.5 nm, 166.8 nm, etc.), a second layer 60-2 having a thickness from 10-15 nm (e.g., 12.0 nm, 12.3 nm, 15 nm, 10 nm, 10.3 nm, etc.), a third layer 60-3 having a thickness from 65-76 nm (e.g., 71.5 nm, 75.7 nm, 67.5 nm, 69.3 nm, etc.), a fourth layer 60-4 having a thickness from 20-35 nm (e.g., 20.1 nm, 26.5 nm, 28.9 nm, 34.0 nm, etc.), a fifth layer 60-5 having a thickness from 62-68 nm (e.g., 66.4 nm, 65.9 nm, 63.6 nm, etc.), a sixth layer 60-6 having a thickness from 41-50 nm (e.g., 45.8 nm, 42.2 nm, 43.6 nm, 49.2 nm, etc.), a seventh layer 60-7 having a thickness from 20-30 nm (e.g., 20.1 nm, 25.7 nm, 26.6 nm, 28.5 nm, etc.), an eighth layer 60-8 having a thickness from 70-76 nm (e.g., 72.2 nm, 71.5 nm, 75.9 nm, 75.7 nm, etc.), and a ninth layer 60-9 having a thickness from 93-98 nm (e.g., 94.8 nm, 93.2 nm, 94.9 nm, 96.6 nm, 98.0 nm, etc.).

As yet another example, coating 50 may be configured as coating 50D of FIG. 7 and may be provided with a first layer 60-1 having a thickness from 172-180 nm (e.g., 171.5 nm, 172.3 nm, 175.0 nm, 180.0 nm, etc.), a second layer 60-2 having a thickness from 10-15 nm (e.g., 10.1 nm, 12.3 nm, 12.0 nm, 14.1 nm, 10.2 nm, etc.), a third layer 60-3 having a thickness from 51-61 nm (e.g., 51.5 nm, 55.7 nm, 55.8 nm, 58.3 nm, 58.5 nm, 59.3 nm, etc.), a fourth layer 60-4 having a thickness from 32-38 nm (e.g., 35.5 nm, 36.5 nm, 32.9 nm, 36.0 nm, 37.0 nm, etc.), a fifth layer 60-5 having a thickness from 35-40 nm (e.g., 39.4 nm, 38.6 nm, 35.6 nm, etc.), a sixth layer 60-6 having a thickness from 58-64 nm (e.g., 60.8 nm, 58.2 nm, 60.6 nm, 62.3 nm, etc.), a seventh layer 60-7 having a thickness from 5-12 nm (e.g., 7.1 nm, 10.0 nm, 11.0 nm, 11.8 nm, etc.), an eighth layer 60-8 having a thickness from 80-89 nm (e.g., 86.7 nm, 81.5 nm, 85.5 nm, 88.9 nm, etc.), and a ninth layer 60-9 having a thickness from 85-95 nm (e.g., 86.8 nm, 93.2 nm, 94.9 nm, 91.6 nm, 95.0 nm, etc.). These examples are merely illustrative and, in general, coating 50 may be configured as any of coatings 50A-50G of FIG. 7 or using other layers.

Rows 80-86 of FIG. 7 show exemplary optical characteristics associated with coatings 50A-50G. Rows 80 and 82 illustrate exemplary photopic reflectance R % of visible light for each coating (e.g., the percent of inbound visible light energy that is reflected by the coating, where the wavelengths of reflected visible light are weighted following the natural response of the human eye). The particular values of rows 80 and 82 show photopic reflectance in response to an illumination source such as CIE standard illuminant D65 and a CIE 1931 color space but, in general, can be characterized using any desired standardized illuminant. The values of rows 80 and 82 and the photopic reflectance values described herein are defined only by the first reflection at the top surface of display cover layer (substrate) 32 and do not account for reflection off of the bottom surface of display cover layer 32. Row 80 characterizes photopic reflectance at $\theta=10$ degrees from the normal axis (e.g., normal axis 54 of FIG. 3) whereas row 82 characterizes photopic reflectance at $\theta=45$ degrees. As shown by rows 80 and 82, coatings 50A-50G each exhibit relatively low photopic reflectance (e.g., less than 1.5%, less than 1.4%, etc.), with superior antireflective characteristics for light closer to the normal axis.

Rows 84 and 86 of FIG. 7 illustrate exemplary infrared transmission (transmittance) T % for infrared light across a corresponding infrared wavelength range (e.g., the percent of infrared energy from 930-950 nm incident on one side of the coating that is transmitted through the coating). These values illustrate the transmission of only coating 50 and, if the effects of the underlying substrate 32 are taken into account, each of these values are reduced by approximately 4% (e.g., to recover the total infrared transmittance through display 14). Row 84 characterizes infrared transmittance at $\theta=10$ degrees from the normal axis whereas row 86 characterizes infrared transmittance at $\theta=45$ degrees. As shown by rows 84 and 86, coatings 50A-50G exhibit relatively high infrared transmittance (e.g., greater than 89%), with greater transmittance for light closer to the normal axis. Some of coatings 50A-50G exhibit superior infrared transmittance (and thus superior performance for infrared-based optical component 20 of FIG. 3) than others. As an example, coating 50A exhibits a maximum infrared transmittance that is greater than 95% regardless of angle. Any of coatings 50B-50G may be used if desired and may still offer adequate infrared transmission characteristics for infrared-based component 20 (FIG. 3) while limiting visible light reflection for display 14 (e.g., despite sacrificing some infrared transmission, manufacturing complexity, cost, mechanical stress to substrate 32, etc.).

The example of FIG. 7 in which infrared transmittance T % is given for 930-950 nm is merely illustrative. More generally, coating 50 (e.g., coating 50A) may exhibit an infrared transmittance T % at 45 degrees or lower (relative to the normal axis) of greater than or equal to 94% over any desired wavelength range (e.g., between 935 nm and 945 nm, between 920 nm and 960 nm, between 900 nm and 1000 nm, at wavelengths lower than 900 nm, etc.). Similarly, coating 50 may generally exhibit a photopic reflectance R % at 45 degrees or lower that is less than or equal to 1.5% to accommodate the operation of display 14. In this way, coating 50 may transmit a sufficient amount of infrared light at the wavelength(s) of operation of infrared-based optical component 20 (FIG. 3) so that component 20 can exhibit satisfactory performance (e.g., in performing facial recognition operations) while also preventing visible reflection and glare that would otherwise obscure images displayed using display 14.

Figure 8:
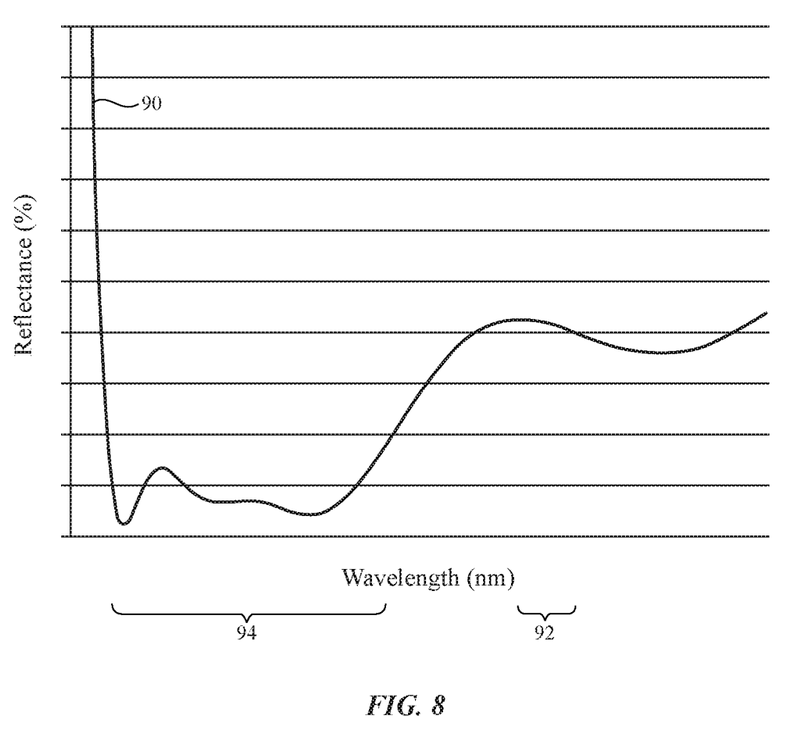
FIG. 8 is a graph in which reflectance has been plotted as a function of wavelength for an illustrative infrared-transparent antireflection coating in accordance with an embodiment.

Curve 90 in the graph of FIG. 8 illustrates the visible light antireflection performance (reflectance from 400-700 nm) and the infrared light transmission performance of coating 50 (e.g., in an example where coating 50 is configured using the layers of coating 50A of FIG. 7). As shown by curve 90, coating 50 exhibits a relatively low infrared reflectance and thus a relatively high infrared transmittance (e.g., greater than 94%) within the operational wavelengths associated with infrared-based optical component 20 (e.g., within region 92), as well as an even lower visible light reflectance (e.g., within region 94). For example, as shown by curve 90, coating 50 exhibits both a per-wavelength reflectance and a photopic reflectance (e.g., as found by integrating reflectance using weights based on the natural response of the human eye) of less than 1.5%.

Figure 9A:
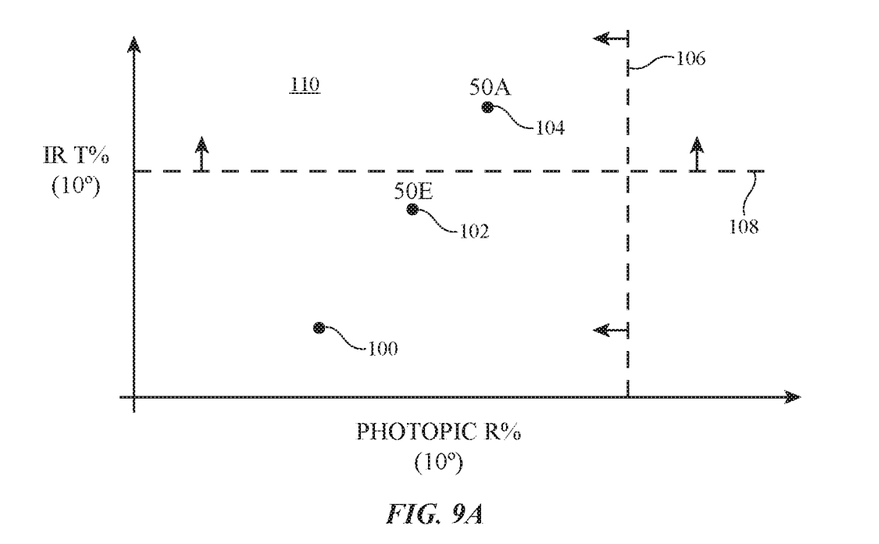
FIGS. 9A and 9B are plots of infrared transmittance versus visible (photopic) reflectance for illustrative infrared-transparent antireflection coatings in accordance with an embodiment.
Figure 9B:
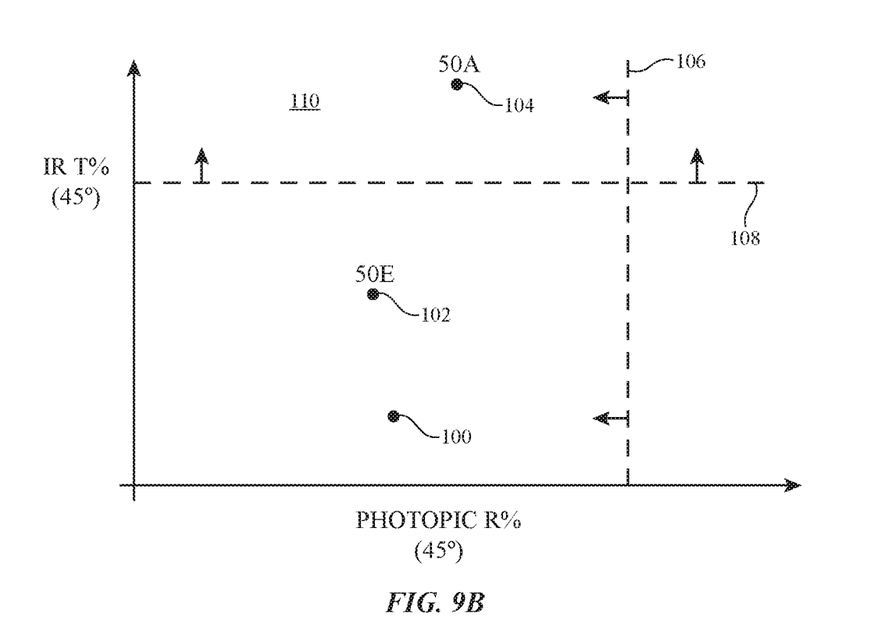

FIG. 9A is a plot of infrared transmittance T % (e.g., from 920-960 nm) versus visible (photopic) reflectance R % at ten degrees with respect to normal and FIG. 9B is a plot of infrared transmittance T % versus photopic reflectance R % at forty-five degrees with respect to normal for different coatings 50 that may be coated over display cover layer 32. As shown in FIGS. 9A and 9B, point 100 plots the optical characteristics of an exemplary nine alternating high/low index layer coating that may be provided for display cover layers that do not also cover infrared light emitting components. Because these types of cover layers do not also need to convey infrared light for corresponding infrared emitters and/or sensors, the coatings exhibit relatively low infrared transmittance T % regardless of angle (e.g., less than 87%).

Point 104 in FIGS. 9A and 9B plots the optical characteristics of coating 50A of FIG. 7 as an example. As shown in FIGS. 9A and 9B, coating 50A exhibits superior infrared transmittance T % and comparable photopic reflectance R % relative to point 100 regardless of angle. Coating 50A may therefore convey infrared light for infrared-based optical component 20 (FIG. 3) without significant attenuation, thereby ensuring satisfactory performance of component 20.

At the same time, coating 50A may mitigate visible reflection such that photopic reflectance R % is less than threshold 106 (e.g., a photopic reflectance of 1.5%). This is merely illustrative and, in general, coating 50 may be provided with any suitable layers that configure coating 50 to exhibit an infrared transmittance T % greater than threshold 108 (e.g., 94%, 95%, etc.) and a photopic reflectance R % less than threshold 106 at both ten and forty-five degrees (e.g., coating 50 may lie at any desired location within region 110 of FIGS. 9A and 9B). In another suitable arrangement, if desired, some infrared transmission may be sacrificed (e.g., to below threshold 108) to simplify manufacturing complexity (e.g., using coating 50E of FIG. 7, as illustrated by point 102 of FIGS. 9A and 9B). Coating 50E may still exhibit superior infrared transmittance relative to the coating associated with point 100. Coatings 50 may sacrifice some photopic reflectance in order to recover greater infrared transmittances that are not otherwise attainable by the coating associated with point 100.

Figure 10:
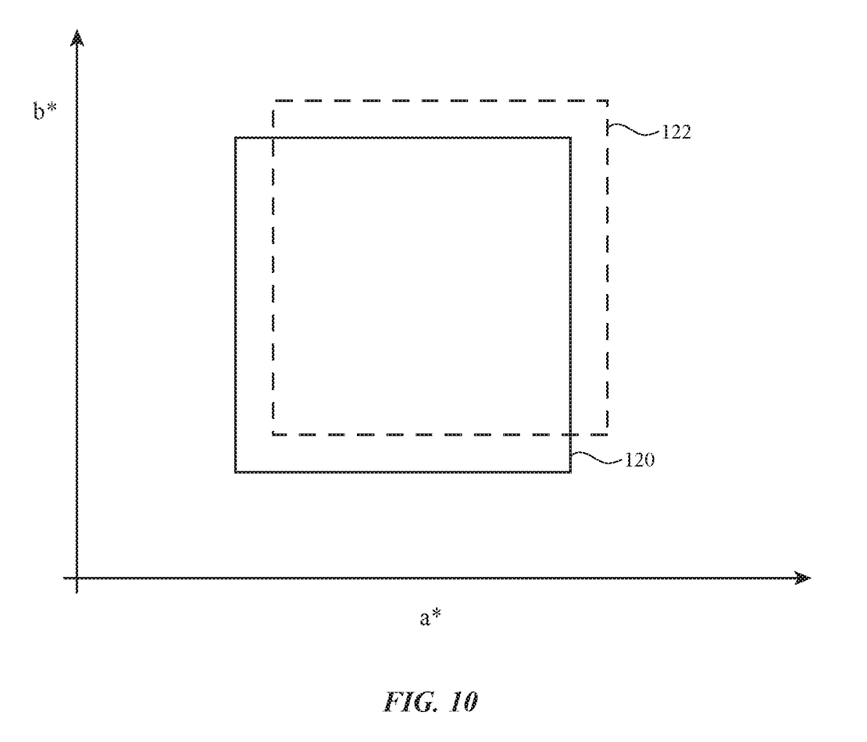
FIG. 10 is a plot of L*a*b* color space for illustrative infrared-transparent antireflection coatings of the type shown in FIGS. 5-7 in accordance with an embodiment.

Infrared-transparent antireflection coating 50 may also reflect different colors of visible light at different angles (e.g., to contribute to the aesthetic appearance of display cover layer 32 of FIG. 3). FIG. 10 is a plot of CIE L*a*b* (CIELAB or Lab) color space for the visible light that is reflected by coating 50. As shown in FIG. 10, visible light that is reflected by coating 50 (display 14) at 10 degrees with respect to normal lies within box 120 whereas visible light that is reflected by 45 with respect to normal lies within box 122. The lower limits along the a* axis of boxes 120 and 122 may be −10, −9, −8, −6, −4, −2, between −10 and −2, between −12 and 0, greater than 0, etc. The upper limits along the a* axis of boxes 120 and 122 may be 0, 1, 2, 3, 4, 5, 6, 8, 10, between 1 and 4, between 2 and 6, between 0 and 10, less than 0, etc. The upper limit along the b* axis of boxes 120 and 122 may be 0, 1, 2, 4, 6, between 0 and 6, between −4 and 4, less than −4, greater than 4, etc. The lower limit along the b* axis of boxes 120 and 122 may be between −14 and −6, between −12 and −4, 0, −2, −5, less than −12, greater than 0, etc. These examples are merely illustrative and, in general, coating 50 may be provided with any desired color profile.

As shown by boxes 120 and 122, the color of display cover layer 32 remains relatively constant at different angles. The layers of coating 50 may be selected (e.g., using coatings 50A-50G of FIG. 7) to exhibit a color profile such as the color profile shown in FIG. 10 (e.g., so that display cover layer 32 has a desired aesthetic appearance) while also maximizing infrared transmittance T % and minimizing photopic reflectance R % (e.g., as shown in FIGS. 8, 9A, and 9B), and while also optimizing manufacturing cost and complexity and mechanical stress to substrate 32. This may allow infrared-based components 20 to perform satisfactory infrared emission and sensing operations (e.g., facial detection operations) despite the presence of an antireflective coating over display cover layer 32 (e.g., while allowing display 14 to emit clear, glare-free images). Providing both infrared transmissive and visible reflective capabilities with the same infrared-transparent antireflection coating 50 may allow the same antireflection coating to be used to coat the entire display cover layer, thereby minimizing manufacturing expense and optimizing long-term durability for display 14. The layers 60 in coating 50 may be deposited using physical vapor deposition (e.g., evaporation and/or sputtering), cathodic arc deposition, chemical vapor deposition, ion plating, laser ablation, or any other desired deposition techniques.

The foregoing is merely illustrative and various modifications can be made to the described embodiments. The foregoing embodiments may be implemented individually or in any combination.

What is claimed is:

1. An electronic device comprising:
   a housing;
   a display in the housing having a display cover layer and an array of pixels configured to emit visible light through the display cover layer;
   an infrared light emitting component in the housing that is configured to emit infrared light through the display cover layer; and
   a coating on the display cover layer that overlaps the array of pixels in a direction normal to the array of pixels and that comprises a stack of thin-film interference filter layers including alternating lower refractive index layers and higher refractive index layers, wherein the coating has a total thickness of 300-700 nm and is configured to exhibit a photopic reflectance of less than 1.5% and an infrared transmittance of greater than 94%.

2. The electronic device defined in claim 1, wherein each of the lower refractive index layers has an index of refraction less than or equal to 1.5.

3. The electronic device defined in claim 2, wherein each of the higher refractive index layers has an index of refraction greater than or equal to 1.7.

4. The electronic device defined in claim 3, wherein the lower refractive index layers comprise silicon dioxide.

5. The electronic device defined in claim 4, wherein the higher refractive index layers comprise silicon nitride.

6. The electronic device defined in claim 1, wherein the coating is a nine-layer coating having five of the lower refractive index layers and four of the higher refractive index layers, the lower refractive index layers forming uppermost and lower-most layers of the coating.

7. The electronic device defined in claim 6, wherein the lower refractive index layers comprise a first layer having a thickness between 135.0 nm and 141.0 nm and the higher refractive index layers comprise a second layer having a thickness between 8.0 nm and 14.0 nm.

8. The electronic device defined in claim 1, wherein the coating is a seven-layer coating having four of the lower refractive index layers and three of the higher refractive index layers, the lower refractive index layers forming uppermost and lower-most layers of the coating.

9. The electronic device defined in claim 1, wherein the coating is configured to exhibit the infrared transmittance greater than 94% across an infrared band from 920 nm to 960 nm.

10. The electronic device defined in claim 9, wherein the infrared light emitting component is configured to emit infrared light at a wavelength within the infrared band from 920 nm to 960 nm through the display cover layer and the coating.

11. The electronic device defined in claim 10, wherein the photopic reflectance is less than or equal to 1.5% at a forty-five-degree angle with respect to a normal axis of the display cover layer.

12. The electronic device defined in claim 11, wherein the infrared transmittance is greater than 95% within the infrared band from 920 nm to 960 nm at the forty-five-degree angle with respect to the normal axis.

13. The electronic device defined in claim 10, further comprising:

an infrared light sensor configured to receive a reflected version of the emitted infrared light through the coating and the display cover layer.

14. The electronic device defined in claim 13, further comprising control circuitry configured to perform facial recognition operations based on the reflected version of the emitted infrared light received by the infrared light sensor.

15. The electronic device defined in claim 10, wherein the infrared light emitting component comprises a dot projector, the electronic device further comprising an infrared flood illuminator configured to emit additional infrared light through the display cover layer and the coating.

16. The electronic device defined in claim 1, wherein the photopic reflectance is less than or equal to 1.37% at an angle of less than or equal to 45 degrees with respect to a surface normal of the display cover layer, and wherein the infrared transmittance is greater than or equal to 95.1% between 930 nm and 950 nm at the angle.

17. An electronic device having an interior and an exterior, the electronic device comprising:
  a housing;
  a display in the housing having a display cover layer and an array of pixels configured to emit visible light through the display cover layer, wherein the display cover layer has an outer surface that faces the exterior and an opposing inner surface that faces the interior;
  an infrared light sensor in the housing that is configured to receive infrared light through the display cover layer; and
  a visible light antireflection coating on the exterior of the display cover layer that comprises a stack of seven thin-film interference filter layers including four lower refractive index layers interleaved with three higher refractive index layers, wherein the coating is configured to exhibit a photopic reflectance of less than or equal to 1.16% at an angle less than or equal to forty-five degrees with respect to a normal axis of the display cover layer, and wherein the coating is configured to exhibit an infrared transmittance between 930 nm and 950 nm of greater than or equal to 89.9% at the angle.

18. The electronic device defined in claim 17, wherein the four lower refractive index layers comprise a first layer having a thickness between 66.0 nm and 70.0 nm and wherein the three higher refractive index layers comprise a second layer having a thickness between 9.0 nm and 19.0 nm.

19. An electronic device comprising:
  a housing;
  a display in the housing having a display cover layer and an array of pixels;
  an optical coating on the display cover layer, wherein the array of pixels is configured to emit visible light through the optical coating and the display cover layer, and wherein the optical coating comprises:
    a first set of layers comprising a lower-most layer and an uppermost layer of the optical coating, wherein each of the layers in the first set has a first index of refraction, and
    a second set of layers interleaved among the layers in the first set, wherein each of the layers in the second set has a second index of refraction greater than the first index of refraction, and wherein each of the layers in the first and second sets have respective thicknesses that configure the optical coating to exhibit an infrared transmittance of 94% from 920-960 nm and that configure the optical coating to exhibit a photopic reflectance of less than 1.5%; and
  an infrared light sensor in the housing that is configured to receive infrared light through the coating and the display cover layer.

20. The electronic device defined in claim 19, wherein each of the layers in the first set comprise silicon dioxide, each of the layers in the second set comprise silicon nitride, and the optical coating has a total thickness between 300 nm and 700 nm.

* * * * *